(12) United States Patent
Huang

(10) Patent No.: US 7,918,022 B2
(45) Date of Patent: Apr. 5, 2011

(54) METHOD OF PRODUCING A COOLING CHANNEL PISTON FOR AN INTERNAL COMBUSTION ENGINE

(75) Inventor: Yuejun Huang, Place, IN (US)

(73) Assignee: KS Kolbenschmidt GmbH, Neckarsulm (DE)

( * ) Notice: Subject to any disclaimer, the term of this patent is extended or adjusted under 35 U.S.C. 154(b) by 508 days.

(21) Appl. No.: 10/963,446

(22) Filed: Oct. 13, 2004

(65) Prior Publication Data
US 2006/0000087 A1    Jan. 5, 2006

(30) Foreign Application Priority Data
Jun. 30, 2004   (DE) .......................... 10 2004 031 513

(51) Int. Cl.
*B23P 15/10* (2006.01)

(52) U.S. Cl. ............. 29/888.04; 29/888.049; 29/888.05; 92/172; 92/186

(58) Field of Classification Search ......... 29/888.04–888.051; 92/186
See application file for complete search history.

(56) References Cited

U.S. PATENT DOCUMENTS

| | | | |
|---|---|---|---|
| 2,244,008 A * | 6/1941 | Hazen et al. ............ 92/176 |
| 4,587,932 A | 5/1986 | Moebus | |
| 4,608,947 A | 9/1986 | Stadler | |
| 4,662,047 A * | 5/1987 | Berchem ............ 29/888.04 |
| 4,838,149 A | 6/1989 | Donnison et al. | |
| 4,986,167 A | 1/1991 | Stratton et al. | |
| 5,052,280 A | 10/1991 | Kopf | |
| 5,146,883 A | 9/1992 | Reipert et al. | |
| 5,261,363 A | 11/1993 | Kemnitz | |
| 5,778,533 A | 7/1998 | Kemnitz | |
| 5,778,846 A | 7/1998 | Mielke | |
| 6,026,777 A | 2/2000 | Kemnitz et al. | |
| 6,202,619 B1 | 3/2001 | Keller et al. | |
| 6,474,220 B2 | 11/2002 | Ries | |
| 6,763,757 B2 * | 7/2004 | Huang et al. ............ 92/186 |
| 2004/0168319 A1 * | 9/2004 | Mielke ............ 29/888.04 |

FOREIGN PATENT DOCUMENTS

| | | |
|---|---|---|
| DE | 1 301 629 | 8/1969 |
| DE | 36 43 039 A1 | 6/1988 |
| DE | 41 34 528 A1 | 5/1992 |
| DE | 41 34 529 A1 | 5/1992 |
| DE | 44 46 726 A1 | 6/1996 |

OTHER PUBLICATIONS

Marked-up 6,763,757.*

* cited by examiner

*Primary Examiner* — Rick K Chang
(74) *Attorney, Agent, or Firm* — Young Basile

(57) ABSTRACT

A method of producing a cooling channel piston for an internal combustion engine having a cooling channel in its piston crown, wherein a piston lower section with piston bosses, piston pin bores and piston skirts attach to the piston crown, wherein a piston blank is first produced with a circumferential collar radially projecting in the area of the piston crown, wherein the collar is then formed over, wherein, a seating area for the collar is formed in a transition zone between the piston crown and the piston lower section and the collar is formed over in such a way until its outer radially circumferential edge comes very close to or butts completely against the seating area to form a closed cooling channel.

19 Claims, 1 Drawing Sheet

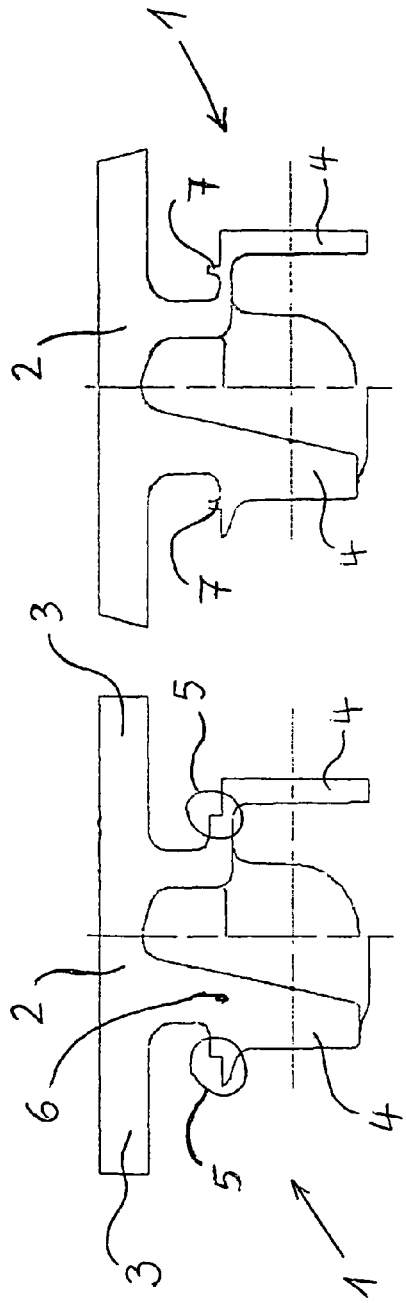
FIG. 1
FIG. 2
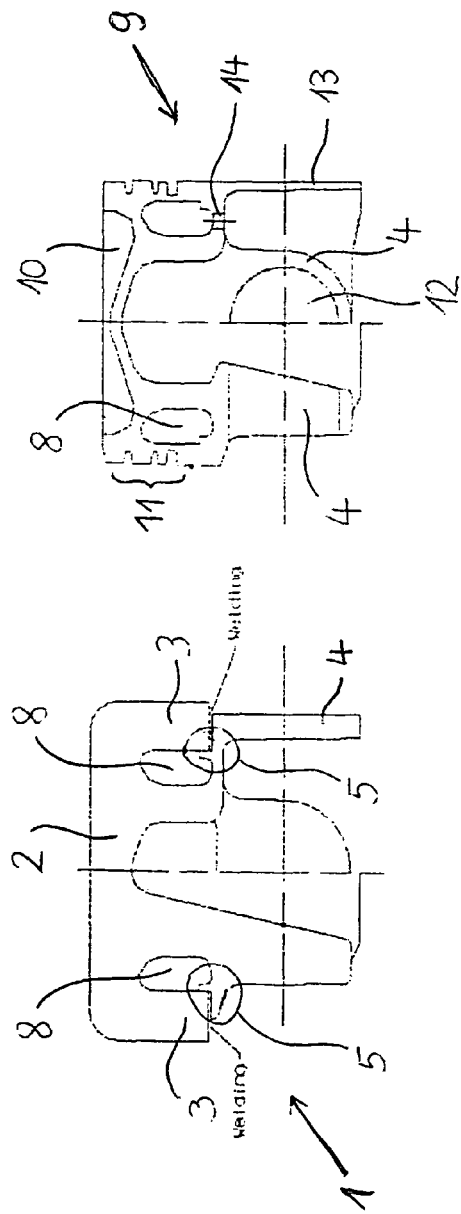
FIG. 3
FIG. 4

METHOD OF PRODUCING A COOLING CHANNEL PISTON FOR AN INTERNAL COMBUSTION ENGINE

BACKGROUND

The invention relates to a method of producing a cooling channel piston for an internal combustion engine.

It is fundamentally known to produce blanks for pistons by casting or forging which possess a cooling channel after final machining. Combinations of both the aforementioned processes are also possible. Forging lends itself to this production method since a piston produced by forging has superior strength properties compared to a piston produced by casting. In the case of piston blanks produced by forging, a complicated process is required to introduce a cooling channel into this piston blank in the ring belt region. In contrast to cast piston blanks, the lost core method cannot be employed with forged pistons. Consequently, the introduction of the cooling channel using appropriate steps causes a recurring problem. A known method is to introduce a radially circumferential recess by metal-cutting machining and to close said recess by suitable means. In so doing, close attention must be paid to the dimensional accuracy of the recess and of the means to close this recess. The result is an additional cost-intensive procedure. The elements involved are correspondingly complicated to manufacture because of the required dimensional accuracy.

A generic method is known from DE 35 02 248 C1 for producing a single-piece piston for a combustion engine by forging. In this process, a piston blank is produced having a pre-form collar, when this collar is turned down at an angle in the upper area of the piston crown by forming over, a piston crown shoulder is created which together with an area of a piston crown pre-form creates a heat-restricting annular gap. Because the collar is formed over in the upper areas of the piston crown, rounded edges are created initially which require reworking of the lateral and top surfaces of the piston blank. A substantial disadvantage additionally results from forming, which weakens the piston crown so that a piston produced in this way is no longer adequate to meet the demands of modern combustion engines with respect to the increased ignition pressures and combustion temperatures required to meet exhaust emissions requirements.

A method of producing a cooling channel piston is known from DE 103 09 016 in which at least one circumferential flange is formed on a forged piston blank specifically in the area of a top land. A recess is introduced behind the at least one flange and subsequently the at least one flange is formed over in such a way that the recess is closed by the at least one flange to form the cooling channel. This process offers one design possibility and a method of producing a cooling channel. The object of the invention is to propose a further method, in addition to the already known method of producing cooling channel pistons, which can be applied to all types of pistons.

SUMMARY

Under the invention, a seating area is formed for the collar in a transition zone between the piston crown (upper section) and the lower section of the piston in such a way that its outer radially circumferential edge comes close to seating or butts fully against the seating area to form a closed cooling channel. The advantage of the seating area is that the collar can be brought into a specified position as it is being formed over, in particular, after the collar is formed over, it comes close to or butts fully against the seating area which is formed from the piston blank. This seating area can be produced at the time the piston blank is cast or forged. It is also conceivable that the seating area is produced in a first pre-form with the piston blank by casting or forging and is subsequently machined, to which metal-cutting machining lends itself in a particularly advantageous way. Depending on the accuracy with which the piston blank was produced, further machining of the seating area may not be necessary after it has been produced with the piston blank. In addition, it is also conceivable that the piston is initially produced without the seating area, which is derived afterwards from the piston blank.

After the radially circumferential collar is formed over and it seats against the seating area (preferably in the area approximately behind a later ring belt), the result is a closed cooling channel and the seating area of the piston blank and the collar can be permanently joined. All available welding methods or other joining methods which result in a permanent bond lend themselves to this.

After the collar is formed over, a piston blank with a radially circumferential cooling channel, as previously described, is now ready. As a consequence of the geometries of the piston blank, the cooling channel is positioned radially circumferentially more or less behind the piston ring belt which is to be located hereafter. Final machining of the piston is then carried out, which specifically includes the step of introducing at least one opening directed toward the cooling channel through which an exchange of a cooling medium, such as engine oil, takes place. This opening can be produced by drilling, milling or in another way. Several openings are possible in addition to one opening, so that there is at least one or several openings for cooling medium to flow into the cooling channel and at least one or several openings to allow cooling medium to drain from the cooling channel. This opening, or several openings, is aligned vertically, horizontally or diagonally to one axis such as the axis of piston motion. Final machining also includes bringing the piston blank to the specified dimension of the later finished cooling channel piston by turning the outer surface of the piston blank to size. The ring grooves of the ring belt, which may be located in the formed-over area of the piston, can also be introduced at this time. Depending on the construction of the piston, specifically with regard to whether it is a one-piece or multi-piece piston, in particular an articulated piston, additional machining steps are needed, as for example introducing a combustion chamber into the piston crown.

DETAILED DESCRIPTION OF THE DRAWING

An embodiment of the inventive method for producing a cooling channel piston, which is not restricted to the present invention, is described in what follows and explained with reference to the drawings in which:

FIGS. 1 through 4 show the individual steps of the inventive method for producing the cooling channel piston.

DETAILED DESCRIPTION

Reference number 1 indicates a piston blank produced, for example, by casting or forging. Other production methods for a piston blank may be involved, as an example extrusion. The method by which the piston blank 1 is produced is normally determined by the design of the piston and the strength requirements for the piston. The piston blank 1 shown in FIG. 1 has a piston crown 2 (upper section), with a collar 3 projecting circumferentially in a radial direction from the piston crown 2. Leading downward from the piston crown 2 are piston bosses 4 with piston skirts and piston pin bores and possibly additional elements which together form a piston lower part.

In a transition zone between the piston crown 2 and the piston lower section, preferably on the upper circumferential edge of the piston boss 4, there is a seating area 5, which is located in a transition zone 6 between the piston crown 2 and the piston lower section. This transition zone 6 is configured in the case of the piston blank 1 in accordance with FIG. 1 as a circumferential web, but it can have different geometries with other differently constructed pistons. The seating area 5 serves to locate the outer radially circumferential edge of the collar 3 after it has been formed over. In order to better define the final position of the collar 3 after it has been formed over, there is a radially circumferential lip 7 or sections of a lip in the seating area 5 in accordance with FIG. 2, with the lip possibly being produced, for example, by metal-cutting machining. This embodiment is shown in FIG. 2, although a simple step may be found in the seating area 5 against which the outer radially circumferential edge of the collar 3 can butt after it has been formed, as the example in FIG. 1 shows. It is particularly advantageous that the seating area 5 is formed or machined in such a way that its shape matches the outer circumferential edge of the collar 3. In so doing, it is not absolutely necessary to bond the collar 3 to the seating area 5. A positive fit between collar 3 and seating area 5 may be all that is necessary to produce an adequate seal for the cooling channel. As an example, the face of the collar can be furnished with a groove which is pressed over a correspondingly shaped bead in the seating area 5 (or the converse) when the collar 3 is formed over. Specifically to increase strength and to improve sealing, the collar 3 is permanently bonded to the piston blank 1 in the seating area 5, in particular using a soldering, welding, adhesive or other process.

FIG. 3 shows the collar 3 after it has been formed over, where it can be seen that the outer circumferential part of the collar 3 is angled at about 90° and is butting against the seating area 5 in said area. As a result of this forming over and the shape of the piston crown 2 which corresponds to the projecting collar 3, a radially circumferential cooling channel is created, wherein it is of particular importance that the inner wall of the transition zone 6 is rounded where it passes over into the collar 3 to ensure the later cross-sectional form of the cooling channel 8. It can also be seen in FIG. 3 that the material thickness of the collar 3 is selected in such a way that the result is a greater diameter of the piston blank 1 for the formed-over collar 3 compared with the outer diameter in the area of the piston bosses 4 with piston skirts. This requires reworking the outer surface of the piston blank thus produced, specifically using metal-cutting machining. The greater thickness of the collar 3 has the benefit that its strength is sufficiently great to allow the collar 3 to be formed over, since the original thickness of the collar 3 is oversized for later piston operation, so that this formed-over region of the collar 3 can be removed by turning. In a preferred manner, the outer circumferential edge of the collar 3 is permanently bonded to the seating area 5 prior to this metal-removing machining of the outer surface of the piston blank 3. This bonding process can be performed at least partially around the radial circumference, (punctiform or in several sections) or completely around the circumference.

After the piston blank 1 has been produced in accordance with FIG. 3, it undergoes final machining so that the finished cooling channel piston is ready after this final machining, indicated in FIG. 4 by the reference numeral 9. In the case of the cooling channel piston design 9 shown by example in FIG. 4, a combustion chamber 10 is introduced in the piston crown 2. In the area of the piston crown 2 and, thus, also at least partially in the area of the formed-over collar 3, ring grooves for a ring belt 11 are introduced. This finished cooling channel piston 9 has a piston pin bore identified as 12 and a piston skirt identified as 13. Similarly, for the exchange of cooling medium into and out of the cooling channel 8 at least one opening 14 is furnished which has been introduced parallel to the axis of piston motion 15 directed toward the cooling channel 8.

In conclusion it should be pointed out that the piston blank 1, or the cooling channel piston 9, is shown in two different views along the axis of piston motion 15 (once to the left and once to the right of the axis of piston motion).

What is claimed is:

1. A method of producing a cooling channel piston for an internal combustion engine which has a cooling channel in a piston crown comprising the steps of:
    providing a piston lower section with piston bosses, piston pin bores and piston skirts attached to the piston crown;
    producing first a piston blank with a circumferential collar projecting radially outward in an area of the piston crown at an angle of about 90° relative to an axis of piston stroke;
    forming a seating area from the piston blank for the collar in a transition zone between the piston crown and the piston lower section; and
    then forming over the collar by bending an outer radially circumferential part of the collar at an angle of about 90° relative to an inner radially circumferential portion of the collar in such manner until an outer radially circumferential edge of the collar comes at least one of very close to and butts completely against the seating area to form a closed cooling channel.

2. The method in accordance with claim 1, wherein:
    a step of forming the piston blank comprises a step of forging the piston blank; and
    a step of forming the seating area includes a step of forming the seating area by metal-cutting machining.

3. The method in accordance with claim 1, wherein a step of forming the seating area includes a step of forming the seating area in such a manner that its shape matches the outer radially circumferential edge of the collar.

4. The method in accordance with claim 1, wherein a step of forming the seating area includes a step of forming the seating area partially, with a radially circumferential lip which determines a final position for a formed-over collar.

5. The method of claim 4 wherein the step of forming the radial circumferential lip further comprises a step of forming the lip as a continuous lip.

6. The method of claim 4 wherein the step of forming the radially circumferential lip comprises a step of forming the lip as a discontinuous lip.

7. The method in accordance with claim 1 further comprising the step of:
    permanently attaching the collar to the seating area in the transition area.

8. The method in accordance with claim 1 further comprising the step of:
    introducing a combustion chamber in the piston crown after the collar has been formed over.

9. The method in accordance with claim 1, further comprising the step of:
    introducing ring grooves for a ring belt in an area of the piston crown after the collar has been formed over.

10. A method of producing a cooling channel piston for an internal combustion engine having a cooling channel in a piston crown comprising the steps of:

producing first the piston blank with a piston crown at an upper end and the piston skirt at a lower end and a collar projecting radially outward from the piston crown and extending radially beyond the piston skirt at an angle of about 90° angle relative to an axis of piston stroke;

forming a seating area from a transition zone in the piston blank between the piston crown and the piston skirt;

then forming over the collar at an essentially 90° angle from the piston crown until an outer radially circumferential edge of the collar at least one of comes very close and butts completely against the seating area to form a closed cooling channel; and after forming over the collar then introducing at least one of a combustion chamber in the piston crown, ring grooves for a ring belt in an area of the piston crown, and a piston pin bore to the piston blank.

11. The method in accordance with claim 10 wherein the step of forming a seating area includes providing a radially circumferential lip on the seat area to define a final position for the collar on the seating area.

12. The method in accordance with claim 11, wherein the step of forming the seating area further includes the step of forming the seating area to provide a positive fit between the outer radially circumferential edge and the seating area.

13. The method in accordance with claim 12, wherein the positive fit includes a groove and a corresponding bead on the seating area and the circumferential edge of the collar.

14. The method in accordance with claim 10 further comprising a step of introducing at least one opening directed toward the closed cooling channel after the step of forming over the collar.

15. In a method of producing a cooling channel piston for an internal combustion engine which has a cooling channel in a piston crown, where a piston lower section with piston bosses, piston pin bores and piston skirts attaches to the piston crown, where first a piston blank is produced with a circumferential collar projecting radially in an area of the piston crown, where the collar is then formed over, wherein in a transition zone between the piston crown and the piston lower section a contact area is formed for the collar and the collar is formed over in such a way until an outer radially circumferential edge comes very close to lying or lying completely against the contact area to form a closed cooling channel, the improvement comprising:

before forming over, the collar projecting at an angle of about 90° relative to the axis of the piston stroke; and after forming over, an outer radially circumferential part of the collar being bent at an angle of about 90° relative to an inner radially circumferential portion of the collar and thus coming to lie in close proximity to or in contact with the contact area.

16. The improvement of claim 15 further comprising:
forming the contact area in such a manner that its shape matches the outer radially circumferential edge of the collar.

17. The improvement of claim 15 further comprising:
forming the contact area at least partially with a radially circumferential lip which determines a final position for the formed over collar.

18. The improvement of claim 15 further comprising:
permanently attaching the collar to the contact area in the transition zone.

19. The improvement of claim 15 further comprising:
introducing a combustion chamber in the piston crown after the collar has been formed over.

* * * * *